(12) United States Patent
Skidmore et al.

(10) Patent No.: US 6,394,630 B1
(45) Date of Patent: May 28, 2002

(54) REMOTE CONTROL LANTERN WITH AUTOMATIC SHUT-OFF FEATURE

(75) Inventors: Keith V. Skidmore, Newton, KS (US); Alton Leung, Tsuen Wan (HK)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/574,800

(22) Filed: May 19, 2000

(51) Int. Cl.[7] ............................ F21V 23/04; F21V 31/00
(52) U.S. Cl. ..................... 362/394; 362/158; 362/186; 362/267; 315/360
(58) Field of Search .................... 362/158, 186, 362/276, 394, 395, 802, 267, 363; 315/209 R, 225, 360; 340/825.71, 825.72, 825.69

(56) References Cited

U.S. PATENT DOCUMENTS

| | | | | |
|---|---|---|---|---|
| 4,433,362 A | * | 2/1984 | Ban ............................ 315/360 |
| 5,192,126 A | | 3/1993 | Remeyer et al. ............ 362/184 |
| 5,205,643 A | * | 4/1993 | Lin ............................. 362/371 |
| 5,400,008 A | * | 3/1995 | Toohey ........................ 340/321 |
| 5,463,595 A | * | 10/1995 | Rodhall et al. ............. 340/573 |
| 5,622,422 A | * | 4/1997 | Rodgers ....................... 362/158 |

OTHER PUBLICATIONS

Coleman 2000 Outdoor Product, Catalog "The Greatest Name in the Great Outdoors", OL1158–100, p. 21 & 23, 1999, USA.

* cited by examiner

*Primary Examiner*—Alan Cariaso
(74) *Attorney, Agent, or Firm*—Kramer, Levin, Naftalis & Frankel LLP

(57) ABSTRACT

A remote control battery powered lantern is disclosed which is comprised of a globe and a base. The base incorporates a radio frequency receiver responsive to a hand held radio frequency transmitter. The lantern may be operated in a remote control mode or an on mode. In the on mode the lantern remains illuminated until manually switched off and in the remote control mode the lantern is controlled by the hand held transmitter. To conserve battery life, the lantern includes a timer circuit to automatically shut off the lantern, in the remote control mode, after a predetermined amount of time as determined by the timer circuit.

20 Claims, 3 Drawing Sheets

US 6,394,630 B1

REMOTE CONTROL LANTERN WITH AUTOMATIC SHUT-OFF FEATURE

FIELD OF THE INVENTION

The present invention relates generally to a battery powered outdoor lantern and, more particularly, to a battery powered lantern having a remote control mode and a timer for automatically shutting off the lantern in the remote control mode.

BACKGROUND OF THE INVENTION

Portable, battery powered lanterns are well known in the art. Such lanterns have been adapted to operate with a remote control and even adapted to float without impairing the operation of the lantern. Indeed, the Coleman Company, Inc. has sold a battery powered remote control lantern and a battery powered lantern adapted to float.

However, these and other prior art battery powered lanterns do not provide an automatic shut off feature to conserve battery life. Thus there exists a need for a portable, battery powered lantern that includes an automatic shut-off feature to preserve battery life. There exists a further need for a portable, battery powered lantern that includes a remote control feature and an automatic shut-off feature. There exists a still further need for such a portable, battery powered lantern that is waterproof and adapted to float without impairing the operation of the lantern.

BRIEF SUMMARY OF THE INVENTION

The present invention provides a lantern comprising: a globe defining a substantially transparent enclosure, a light source mounted within the substantially transparent enclosure; a base for mounting the globe and light source; a switch for connecting the light source to a power source for illuminating the light source, the switch being adjustable between an off mode where no power is supplied to the light source and at least one of an on mode and a remote control mode; and a timer circuit electrically connected between the light source and a power source to automatically turn off the light source after a predetermined time as set by the timer circuit. The lantern is preferably waterproof and adapted to float without impairing the operation of the lantern Accordingly, one of the objects of the present invention is to prevent the lantern from being left on in the remote control mode, thereby extending the battery life. These and other objects of the invention will become apparent with reference to the drawings, the detailed description of the preferred embodiment, and the appended claims.

DESCRIPTION OF THE DRAWINGS

The invention will be explained in conjunction with an exemplary embodiment showing the accompanying drawings in which.

DETAILED DESCRIPTION OF THE EXEMPLARY EMBODIMENT

Figure 1:
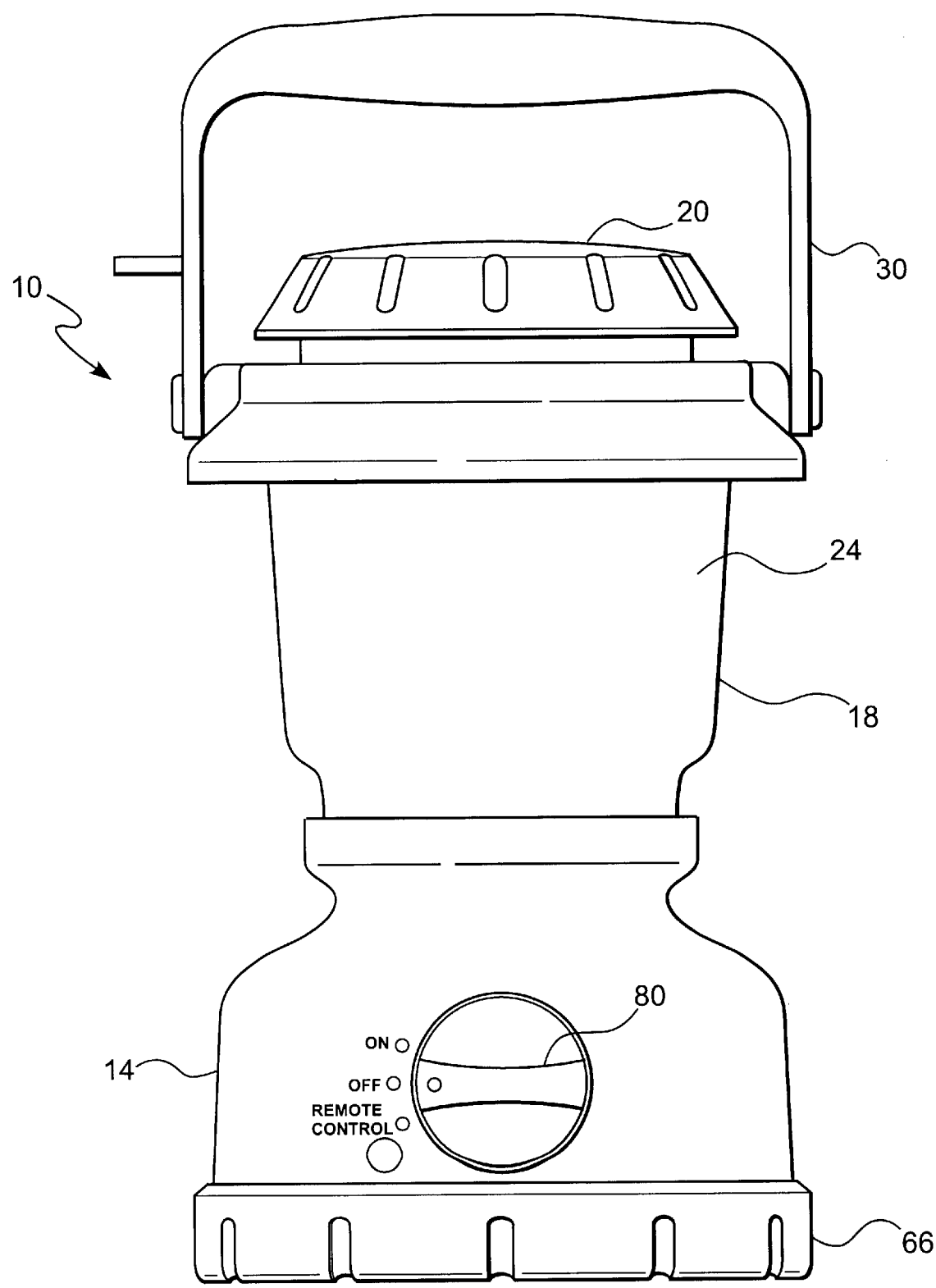
FIG. 1 is a side plan view of the lantern in accordance with an exemplary embodiment of the present invention.

Referring to FIG. 1, a lantern in accordance with an exemplary embodiment of the present invention is generally designated by the reference numeral 10. The lantern 10 comprises a base 14, a globe 18 and a top cap 20. The globe 18 and top cap 20 form a substantially transparent enclosure 24 that houses a light source 28, preferably an incandescent bulb. The lantern 10 also preferably includes a bail or handle 30 that is pivotally mounted to the top cap 20 for carrying the lantern 10.

Figure 2:
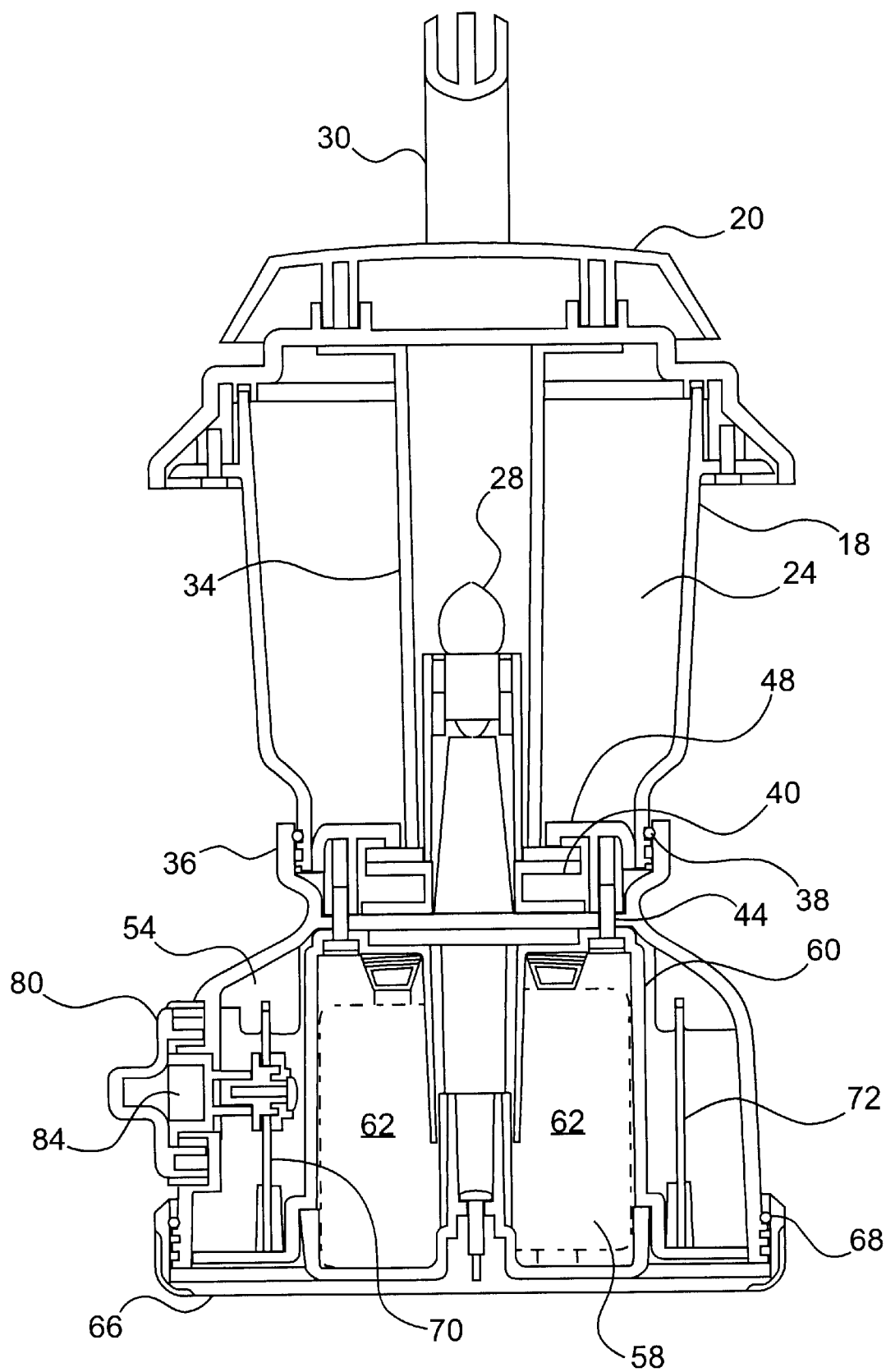
FIG. 2 is a sectional view of the lantern.

As depicted in FIG. 2, the enclosure 24 also houses an elongated bulb lens 34 that extends between the top cap 20 and base 14. The bulb lens 34 is a generally cylindrical tube that encloses the light source 28. The bulb lens 34 is preferably coated with a substantially transparent film or made of a material that has the effect of transforming the incandescent light source illumination into that resembling a fluorescent light source.

Referring further to FIG. 2, the globe 18 includes a threaded end that is received in a threaded neck portion 36 of the base 14 to removably mount the globe 18 to the base 14. When the globe 18 is unscrewed from the base 14, the bulb lens 34 which is secured to the top cap 20 is also removed, allowing the light source 28 to be replaced, if necessary. In addition, since the lantern 10 is preferably water resistant and intended to float, an O-ring 38 is provided to prevent water from entering the enclosure 24 and damaging the light source 28.

The light source 28 is preferably screwed into a support member 40 that extends through a transverse wall 44 of the base 14, as depicted in FIG. 2. The transverse wall 44 which effectively seals off the top end of the base 14 is located just below the neck portion 36 of the base 14. As further shown in FIG. 2, the transverse wall 44 also mounts a reflector 48 within the enclosure 24 that enhances the radiant light generated by the light source 28 within the globe 18. The reflector 48 is secured to the transverse wall 44 of the base 14 by conventional means such as screws, rivets or bolts.

Below the transverse wall 44, the interior of the base 14 includes inner and outer, generally concentric compartments 54, 58. The inner and outer compartments 54, 58 are separated by a substantially square wall 60. The inner compartment 54 defined by square wall 60 includes slots or chambers 62 that are dimensioned to accommodate the lantern powers source such as, for example, four D size dry cell batteries connected in series that result in a total voltage of 6 volts d.c. A bottom cap 66 is provided that includes corresponding electrical contacts, preferably conductive springs, that complete the series circuit. As shown in FIG. 2, the bottom cap 66 and the base 14 include threads for removably mounting the cap 66 to the base 14. An O-ring 68 is also provided to prevent water from entering the interior of the base 14.

The outer chamber 58 includes first and second printed circuit boards 70, 72. The first printed circuit board 70 is electrically connected to the second printed circuit board 72 and also electrically connected to the positive or negative side of the power source, in a conventional manner. For example, an insulated conductor, such as a copper wire, may be soldered between a contact point on the first printed circuit board 70 and a conductor in electrical contact with the power source (e.g., four D size batteries). A similar type conductor may be used to electrically connect the first and second printed circuit boards 70, 72.

As depicted in FIG. 2, the first printed circuit board 70 is also electrically connected to a dial 80. The dial 80 is pivotally mounted to the base 14 rotate in one of three positions: ON, OFF and REMOTE CONTROL. More specifically, the dial 80 includes a selector shaft 84 having a metallic contact that engages contacts (not shown) on the first printed circuit board 70 to establish an electrical connection. Depending on the position of the dial 80, the printed circuit board 70 may establish a direct connection between the light source 28 and power source (e.g., four D size batteries) or may establish a connection between the light source and second printed circuit board 72.

Figure 3:
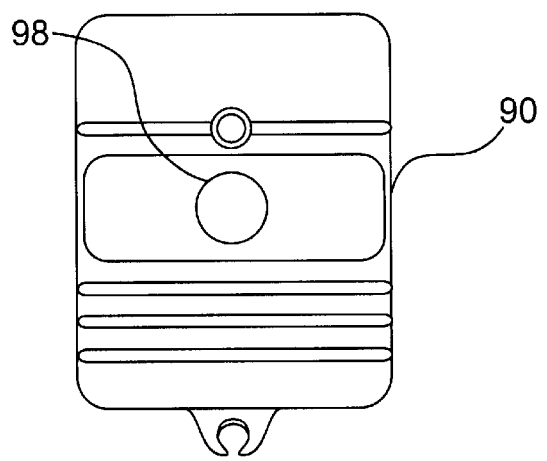
FIG. 3 is a plan view of an R.F. transmitter unit in accordance with the exemplary embodiment of the present invention.

More specifically, when the dial 80 is in the ON position, the first printed circuit board 70 establishes a connection between the power source and the light source 28 to illuminate the light source 28. When the dial 80 is in the REMOTE CONTROL position, the operation of the light source 28 is controlled by a separate R.F. transmitter unit 90, as depicted in FIG. 3.

Figure 4:
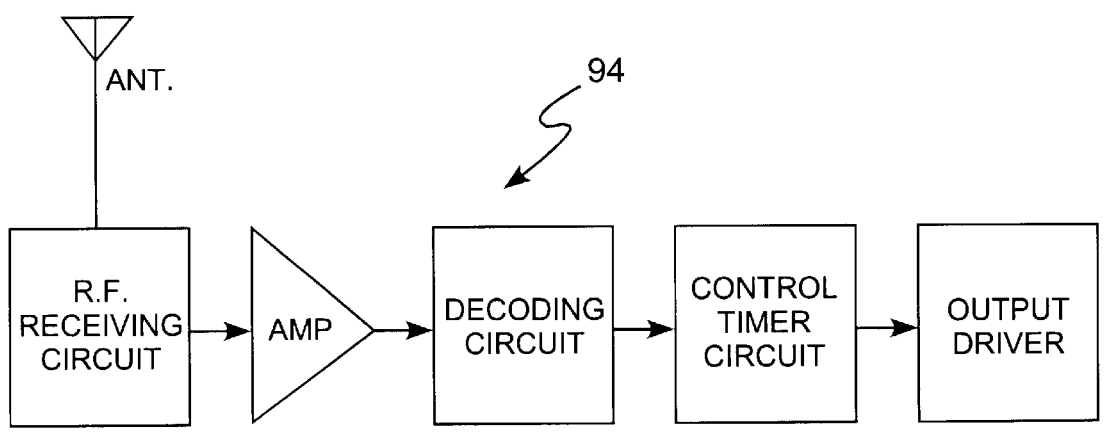
FIG. 4 is a block diagram of the remote control receiving unit including a timer circuit.

Referring now to FIG. 4, the second printed circuit board 72 includes a receiver unit 94 comprising an antenna, an R.F. receiving circuit, amplifier circuit and decoding circuit that are responsive to the R.F. signals radiated by the transmitter unit 90. Although the details of the transmitter unit 90 are not shown, the transmitter unit 90, is preferably a hand held unit including a push type actuator 98 for initiating transmission of an R.F. modulated signal. As is well known, the transmitter unit 90 includes an R.F. source, such as an oscillator, a modulator, encoder and antenna for radiating an R.F. signal.

As is also well known, the receiving unit 94 and, more particularly, the antenna receives the radiated R.F. signal and sends the signal to the R.F. receiving circuit where the signal is demodulated. The demodulated R.F. signal is then optionally fed to an amplifying circuit before being fed to a decoding circuit where the signal is converted to a control signal that is fed to a driver circuit for operating the light source 28. The amplifier can be a pulse amplifier that amplifies the R.F. signal to a level that is able to activate the output driver circuit.

In the exemplary embodiment, a timer circuit is interposed in the R.F. receiving unit 94 to control the length of time the light source 28 remains on in the remote control mode. The timer circuit is preferably a commercially available integrated circuit that functions as a digital clock to control the length of time a signal is delivered to the output driver. Timer circuits are available having a wide range of time constants or periods. To maintain battery life without undue inconvenience to the user, the timer circuit preferably has a time constant of about 60 minutes. That, is after about one hour, the timer circuit will cut-off power thereby automatically extinguishing the light source. As shown in FIG. 4, the timer circuit receives the output of the decoding circuit and feeds the signal to an output driver that controls power to the light source 28.

Alternatively, the timer circuit may be replaced by a well known resistor-capacitor charge circuit or an integrator circuit comprising a transistor, capacitor and resistor. For each of these circuits, the time constant is determined by the values of the resistors and capacitors.

Having described exemplary embodiments of the present invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:

1. A lantern comprising:
   a globe defining a substantially transparent enclosure;
   a light source mounted within said substantially transparent enclosure;
   a base for mounting said globe and light source;
   a switch for connecting said light source to a power source for illuminating said light source, said switch being adjustable between an off mode where no power is supplied to the light source, an on mode where power is supplied to the light source and a remote control mode;
   a timer circuit electrically connected between said light source and a power source to automatically turn off said light source after a predetermined time as set by said timer circuit; and
   a plurality of barriers connected to the substantially transparent enclosure, said plurality of barriers preventing water from entering the substantially transparent enclosure.

2. The lantern of claim 1 wherein each barrier includes an O-ring.

3. The lantern of claim 1 wherein said switch is mounted to said base.

4. The lantern of claim 1 wherein said timer circuit is electrically connected between the light source and power source when said switch is in the remote control mode.

5. A lantern comprising:
   a globe defining a substantially transparent enclosure;
   light source mounted within said substantially transparent enclosure;
   a base for mounting said globe and light source;
   a switch for connecting said light source to a power source for illuminating said light source, said switch being adjustable between an off mode where no power is supplied to the light source and at least one of an on mode and a remote control mode;
   a timer circuit electrically connected between said light source and a power source to automatically turn off said light source after a predetermined time as set by said timer circuit; and
   a first printed circuit board mounting said timer circuit and a second printed circuit board electrically connected to said switch for electrically connecting said light source directly to a power source and separately electrically connecting said first printed circuit board to a power source.

6. The lantern of claim 5 wherein said first printed circuit board further comprises a radio frequency receiving unit for cooperating with a radio frequency transmitter unit for remotely turning on and off said light source.

7. The lantern of claim 1 wherein said base includes a chamber for receiving a plurality of batteries as a power source for illuminating said light source.

8. The lantern of claim 1 further comprising a radio frequency remote control system, said system including a hand held radio frequency transmitting means and a radio frequency receiving means.

9. The lantern of claim 8 wherein said timer circuit is electrically connected between said radio frequency receiving means and said light source.

10. A portable outdoor lantern comprising:
    a globe defining a substantially transparent enclosure;
    a light source mounted within said substantially transparent enclosure;
    a base for mounting said globe and light source, said base including an interior compartment for housing a power source;
    a radio frequency remote control system, said system including a hand held radio frequency transmitting unit and a radio frequency receiving unit, said radio frequency receiving unit mounted within said interior compartment of said base;

a switch for connecting said light source to a power source for illuminating said light source, said switch being variable between an off mode where no power is supplied to the light source, an on mode where power is supplied to said light source and a remote control mode where power to said light source is controlled by said radio frequency remote control system;

a timer circuit electrically connected between said light source and a power source to automatically turn off said light source after a predetermined time as set by said timer circuit; and a plurality of barriers connected to the substantially transparent enclosure, said plurality of barriers preventing water from entering the substantially transparent enclosure.

11. The lantern of claim 10 wherein each barrier includes an O-ring.

12. The lantern of claim 10 wherein said switch is mounted to said base.

13. The lantern of claim 10 wherein said timer circuit is electrically connected between said light source and a power source when said switch is in the remote control mode.

14. A portable outdoor lantern comprising:

a globe defining a substantially transparent enclosure;

a light source mounted within said substantially transparent enclosure;

a base for mounting said globe and light source, said base including an interior compartment for housing a power source;

a radio frequency remote control system, said system including a hand held radio frequency transmitting unit and a radio frequency receiving unit, said radio frequency receiving unit mounted within said interior compartment of said base;

a switch for connecting said light source to a power source for illuminating said light source, said switch being variable between an off mode where no power is supplied to the light source, an on mode where power is supplied to said light source and a remote control mode where power to said light source is controlled by said radio frequency remote control system;

a timer circuit electrically connected between said light source and a power source to automatically turn off said light source after a predetermined time as set by said timer circuit;

a first printed circuit board mounting said timer circuit and a second circuit board mounting said radio frequency receiving unit.

15. The lantern of claim 10 wherein said base includes a chamber for receiving a plurality of batteries as a power source for illuminating said light source.

16. The lantern of claim 10 wherein said timer circuit is electrically connected between said radio frequency receiving unit and said light source.

17. The lantern of claim 10 wherein said radio frequency receiving unit comprises an antenna, R.F. receiving circuit and a decoding circuit.

18. The lantern of claim 17 wherein said radio frequency receiving unit further comprises and amplifier circuit for amplifying the R.F. signal output from said R.F. receiving circuit.

19. The lantern of claim 10 wherein said timer circuit comprises an integrated circuit having a predetermined time constant.

20. The lantern of claim 14 wherein said first printed circuit board further comprises a radio frequency receiving unit for cooperating with a radio frequency transmitter unit for remotely turning on and off said light source.

* * * * *